United States Patent
Darnell

(10) Patent No.: US 6,216,355 B1
(45) Date of Patent: Apr. 17, 2001

(54) COMBINATION SAW GUIDE AND GAUGE

(76) Inventor: Clete Darnell, 5210 Kentucky Dam Rd., Paducah, KY (US) 42003-9458

(*) Notice: Subject to any disclaimer, the term of this patent is extended or adjusted under 35 U.S.C. 154(b) by 0 days.

(21) Appl. No.: 09/318,463

(22) Filed: May 25, 1999

Related U.S. Application Data

(60) Provisional application No. 60/089,605, filed on Jun. 17, 1998, and provisional application No. 60/094,488, filed on Jul. 29, 1998.

(51) Int. Cl.$^7$ .................................................. B23Q 17/22
(52) U.S. Cl. .................................................. 33/630; 33/42
(58) Field of Search .................................. 33/41.1, 41.5, 33/41.6, 42, 628, 630, 640; 83/763, 764; 30/371–376

(56) References Cited

U.S. PATENT DOCUMENTS

| | | | |
|---|---|---|---|
| 2,773,523 | * 12/1956 | Hopla | 33/42 |
| 2,800,933 | 7/1957 | Michael . | |
| 3,043,351 | 7/1962 | Davis . | |
| 4,016,649 | 4/1977 | Kloster . | |
| 4,077,292 | 3/1978 | Cole . | |
| 4,483,071 | * 11/1984 | Te Kolsté | 33/42 |
| 4,503,624 | * 3/1985 | Whiteford | 33/42 |
| 5,035,061 | * 7/1991 | Bradbury et al. | 33/42 |
| 5,103,566 | * 4/1992 | Stebe | 33/42 |
| 5,678,314 | 10/1997 | Braunbach et al. . | |
| 5,735,054 | * 4/1998 | Cole | 33/640 |

FOREIGN PATENT DOCUMENTS

| | | |
|---|---|---|
| 3834220 | 4/1990 | (DE) . |
| 0062379 | 3/1982 | (EP) . |
| 0149233 | 11/1983 | (EP) . |
| 0157005 | 12/1984 | (EP) . |
| 1103967 | 2/1968 | (GB) . |

* cited by examiner

*Primary Examiner*—G. Bradley Bennett

(57) ABSTRACT

The combination saw guide and gauge permits the use of a powered saw such as a circular, jig, or reciprocating saw to make cuts with precision presently requiring a table saw with a circular saw blade. The combination saw guide and gauge comprises a scale with at least one uppeer jaw that, in combination with at least one screw, serves to clamp the device to the base of the powered saw. The scale comprises a base, gradations, and at least one clearance into which a guide member can be inserted. The at least one clearance can be an aperture, a slot, or a groove. The gradations serve as a means of measurement. A purpose served by said means of measurement is enabling setting a width of material to be cut. The device is clampable onto a powered saw base such as is common to, but not restricted to, a circular, jib, or reciprocating saw. An optional guide flange on the scale permits a sawer to grasp and help guide the scale.

14 Claims, 11 Drawing Sheets

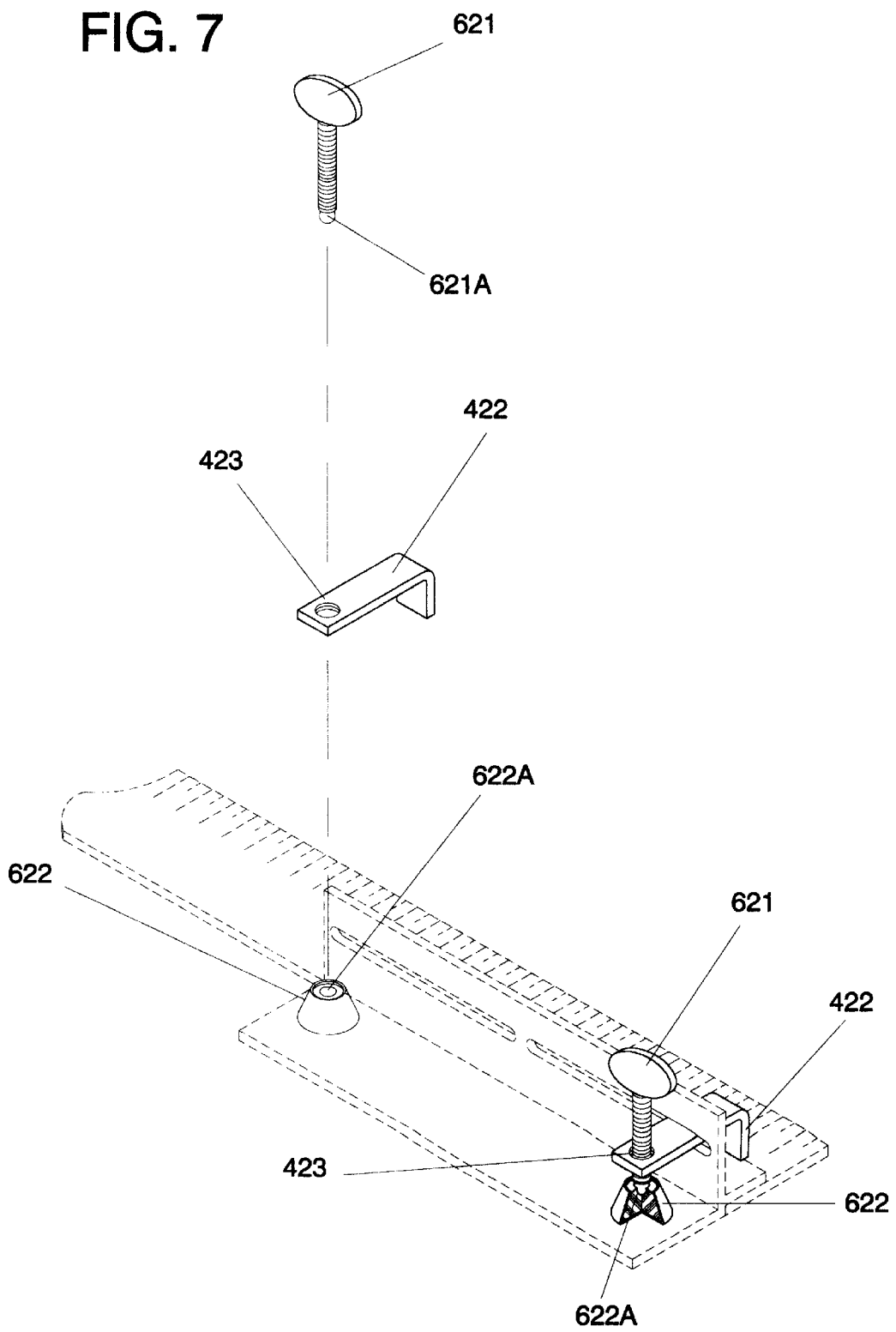

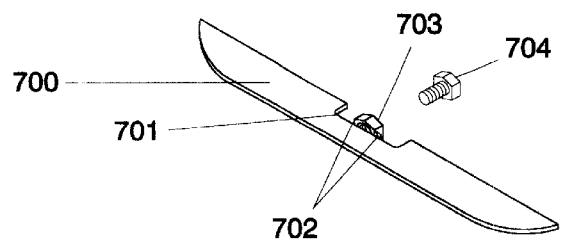
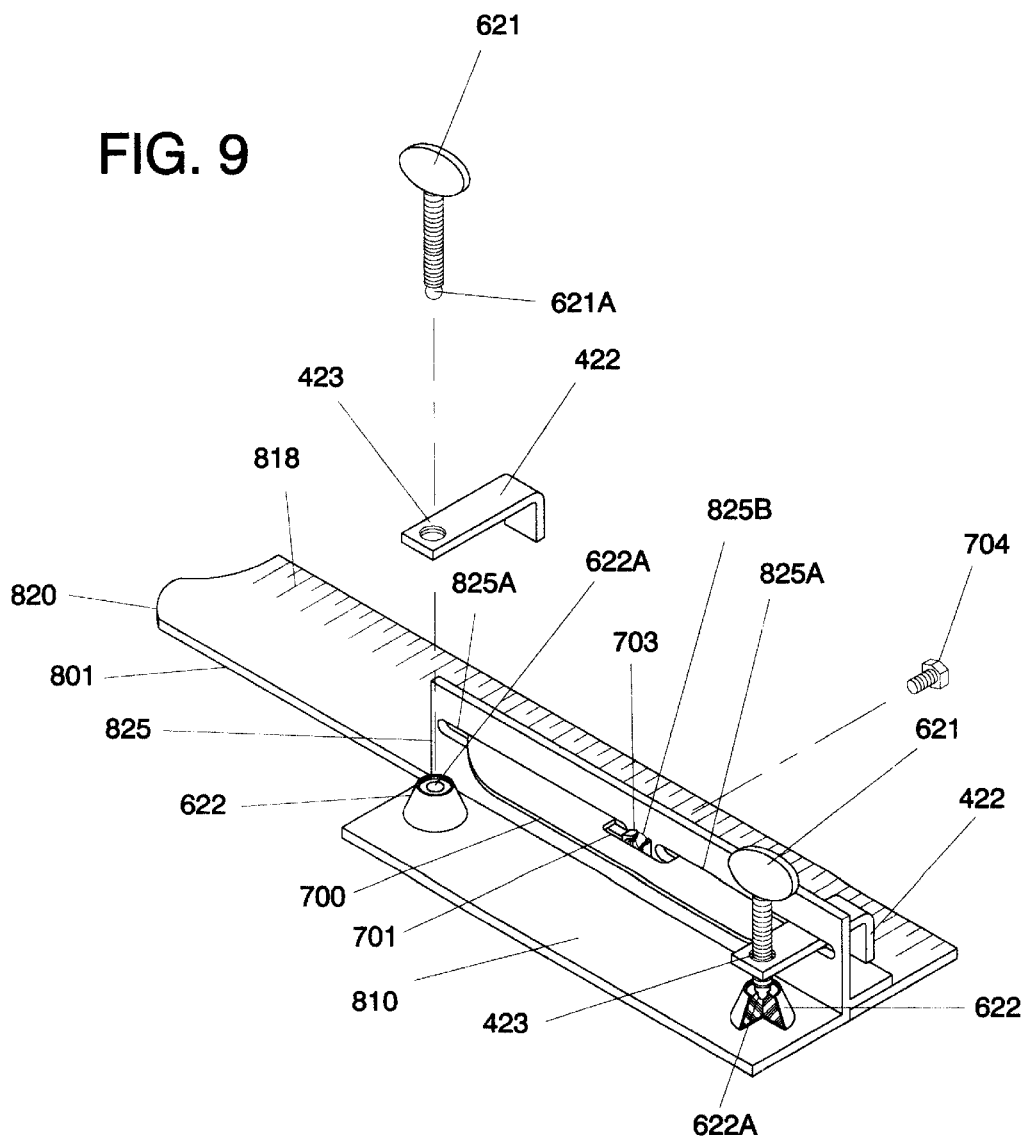

COMBINATION SAW GUIDE AND GAUGE

CROSS REFERENCES TO RELATED APPLICATIONS

Pursuant to 35 U.S.C. Par. 119(e)(i) applicant claims priority of Provisional Application Ser. No. 60/089,605 of Jun. 17, 1998 and Ser. No. 60/094,488 of Jul. 29, 1998 with the same title, Combination Saw Guide and Gauge.

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to a combination saw guide and gauge, applicable to powered saws including, but not restricted to, circular, jig, and reciprocating.

2. Background Information

While powered circular, jig, and reciprocating saws are popular, table saws are required for accurate cutting. For example, to rip saw a plywood sheet that is 4 foot by 8 foot using a table saw, a working area with a length of 22 feet is required, along with either an assistant to help handle the material while it is being sawed or a larger work table requiring even more area.

Also, table saws with circular blades are very dangerous. The circular blade is exposed upward towards the user. Also, one is moving the work through the saw blade as opposed to moving the saw blade through the work. Table saws with circular blades are especially dangerous when used to saw shorter pieces because of the proximity of an operator to the exposed saw blade. As will be seen from the subsequent description of the preferred embodiments of the present invention, the abovementioned shortcomings of the prior art are overcome by the present invention.

SUMMARY

The present invention is a device which permits the use of a powered saw such as, but not restricted to, a circular, jig, or reciprocating saw to make cuts with precision presently requiring a table saw with a circular saw blade. The device comprises a scale with at least one jaw that in combination with a screw serves to clamp the device to the base of the powered saw. The scale includes at least one clearance into which in combination with a guide member and at least one screw, serves as a guide means. The device includes at least one guide means. The clearance can be an aperture, a slot, or a groove. The device is attachable to a powered saw such as, but not restricted to, a circular, jib, or reciprocating saw. An optional guide flange on the scale permits a sawer to grasp and help guide the scale.

BRIEF DESCRIPTION OF THE DRAWINGS

FIG. 7 is an alternate clamp screw.

FIGS. 8 and 9 illustrate a fifth embodiment of the invention.

DESCRIPTION OF THE PREFERRED EMBODIMENTS

Figure 1:
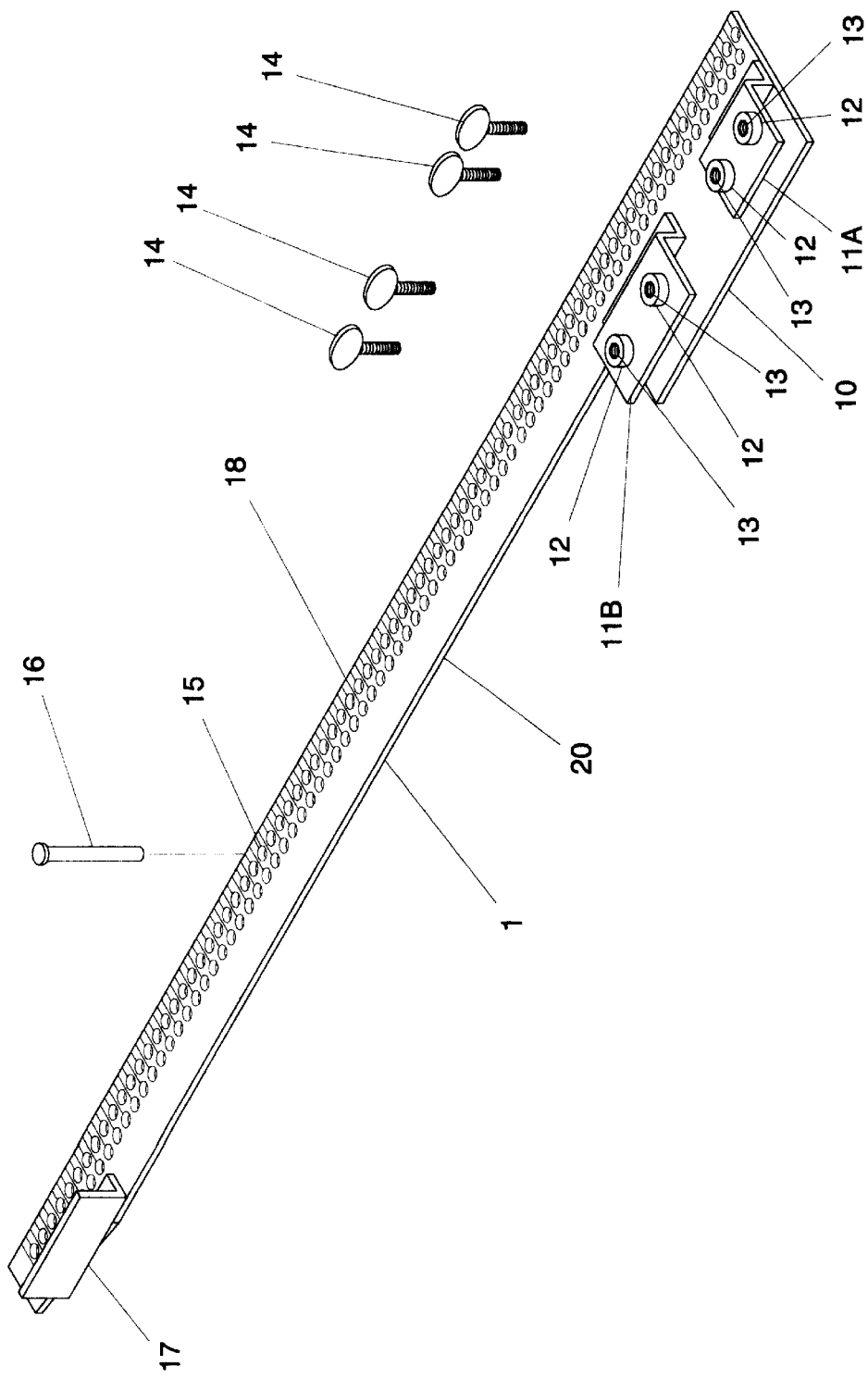
FIG. 1 illustrates a preferred embodiment of the present invention, a combination saw guide and gauge.
Figure 2:
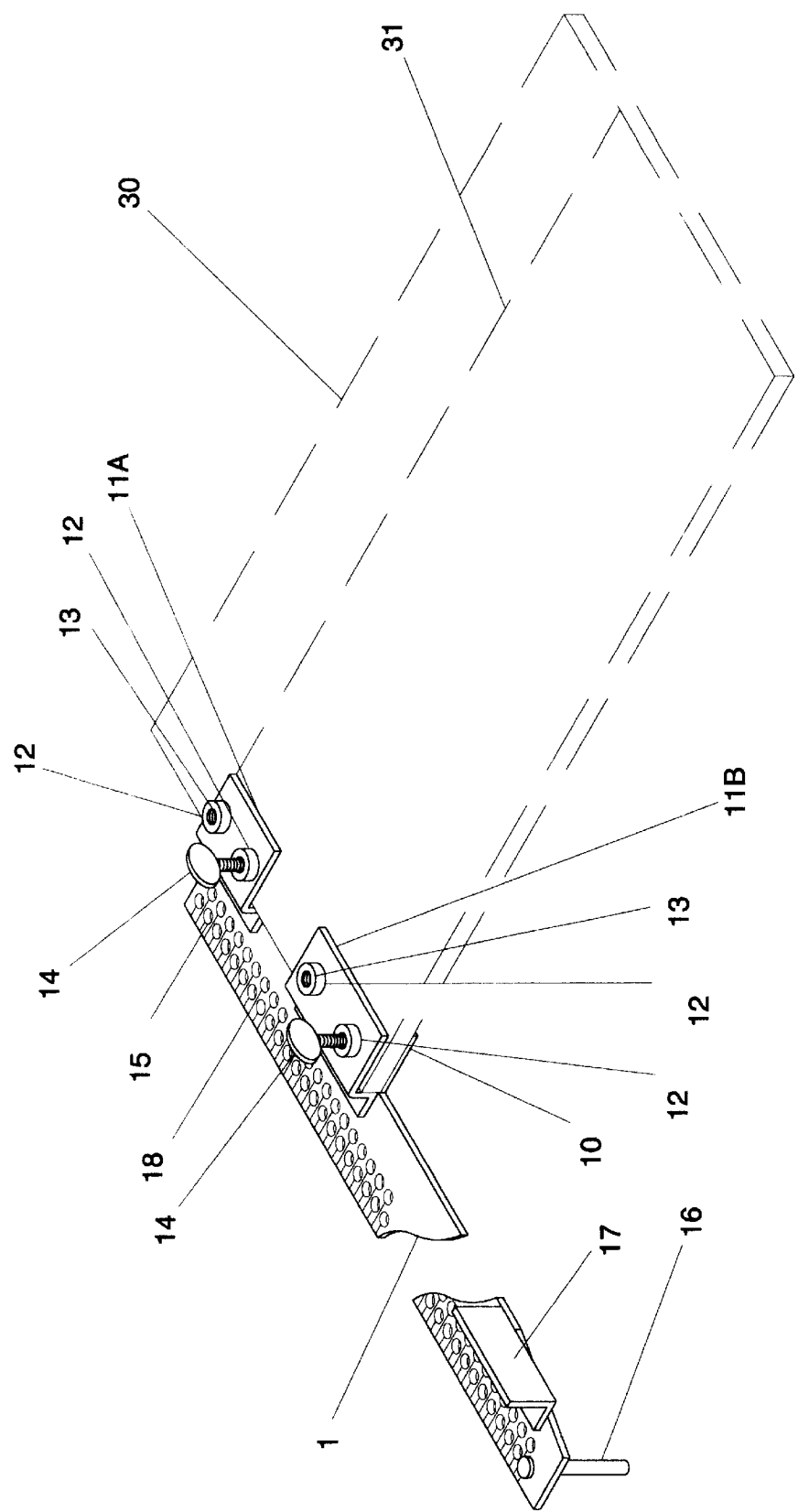
FIG. 2 illustrates the preferred embodiment of the present invention attached to a base plate of a powered saw.

FIG. 1 shows the preferred embodiment of the present invention, a combination saw guide and gauge 1 comprising a scale 20, a short upper jaw 11A, a long upper jaw 11B, screws 14, guide member 16, and an optional guide flange 17. The scale 20 comprises a base 10, apertures 15, and gradations 18. The short upper jaw 11A and the long upper jaw 11B each contain at least one mount reinforcement 12 with a threaded clearance 13. The guide member 16 has a head such that the guide member 16, which fits in each of the apertures 15 will not pass through the aperture 15, being restrained by the head of the guide member 16 which will ride on the surface of the scale 20. Said guide member 16 being suitable for containment within each of the apertures 15, thus serving as a guide means. While cutting a plywood panel with a powered saw, for example, the guide means can be set for the width of the cut, and would ride along the edge of the panel while the powered saw blade is cutting along a cut such as indicated by a dotted line 31 representing a line of cut as shown in FIG. 2.

The combination saw guide and gauge 1 is attachable to a powered saw base, such as is commonly found on powered circular saws, powered jig saws, and powered reciprocating saws. The powered saw base slips in between the upper jaws 11A and 11B, which are coupled to the base 10, and the base 10 and the screws 14 which are inserted into the threaded clearances 13 are tightened to hold the combination saw guide and gage 1 in position on a powered saw base 30 (Ref. FIG. 2). The screws 14 serve as a means of holding the saw guide and gauge in position on the powered saw base 30.

The guide member 16 is inserted through whichever of the apertures 15 provides the appropriate spacing between the guide member 16 and the powered saw. The guide member 16 has a head that holds the guide member 16 in position in the appropriate aperture 15.

In the preferred embodiment of the present invention, the guide member 16 would be a six penny nail, which is a common nail in the carpentry trade.

The optional guide flange 17 is coupled to the scale 20 at an end distal from the upper jaws 11A and 11B. The guide flange 17 is used for longer embodiments of the combination saw guide and gage 1 so a sawer can manually stabilize the guiding action of the invention. This is a desirable feature when ripsawing wide cuts. An example of a wide cut is splitting a 4 foot by 8 foot sheet of plywood down the center.

The gradations 18 serve as a means of measurement.

FIG. 2 shows the combination saw guide and gauge 1 attached to the powered saw base 30 such as is common to a powered saw such as a circular, jig, or reciprocating saw. As previously mentioned, the dotted line 31 indicates the line of cut of the saw. The powered saw base 30 is contained between the upper jaws 11A and 11B and the base 10 of the scale 20. The preferred materials of construction for the preferred embodiment of the present invention are metal. Aluminum has an advantage for weight and ease of forming. Steel has an advantage in terms of wear and strength.

The upper jaws 11A and 11B are affixed to the base 10 which extends from the scale 20. In the preferred embodiment of the present invention the upper jaws 11A and 11B would be coupled to the base 10 by welding. However, as obvious to anyone skilled in the art, there are other ways to couple the upper jaws 11A and 11B to the base 10.

The upper jaws 11A and 11B could be formed from the base 10, but that results in a less rigid structure than is the case of the embodiment of the present invention shown in FIG. 1.

In the preferred embodiment of the present invention, the apertures 15 are staggered in rows to permit minute adjustments so as to enable relatively precise cuts. While two rows permit one eight inch adjustments with clearances of approximately 3/32 inch diameters, more rows would permit more minute adjustments. A 3/32 inch diamter clearance suffices for a six penny nail, which serves as a guide member 16 one of the apertures 15, serving as a guide means for most cuts in lumber.

Figure 3:
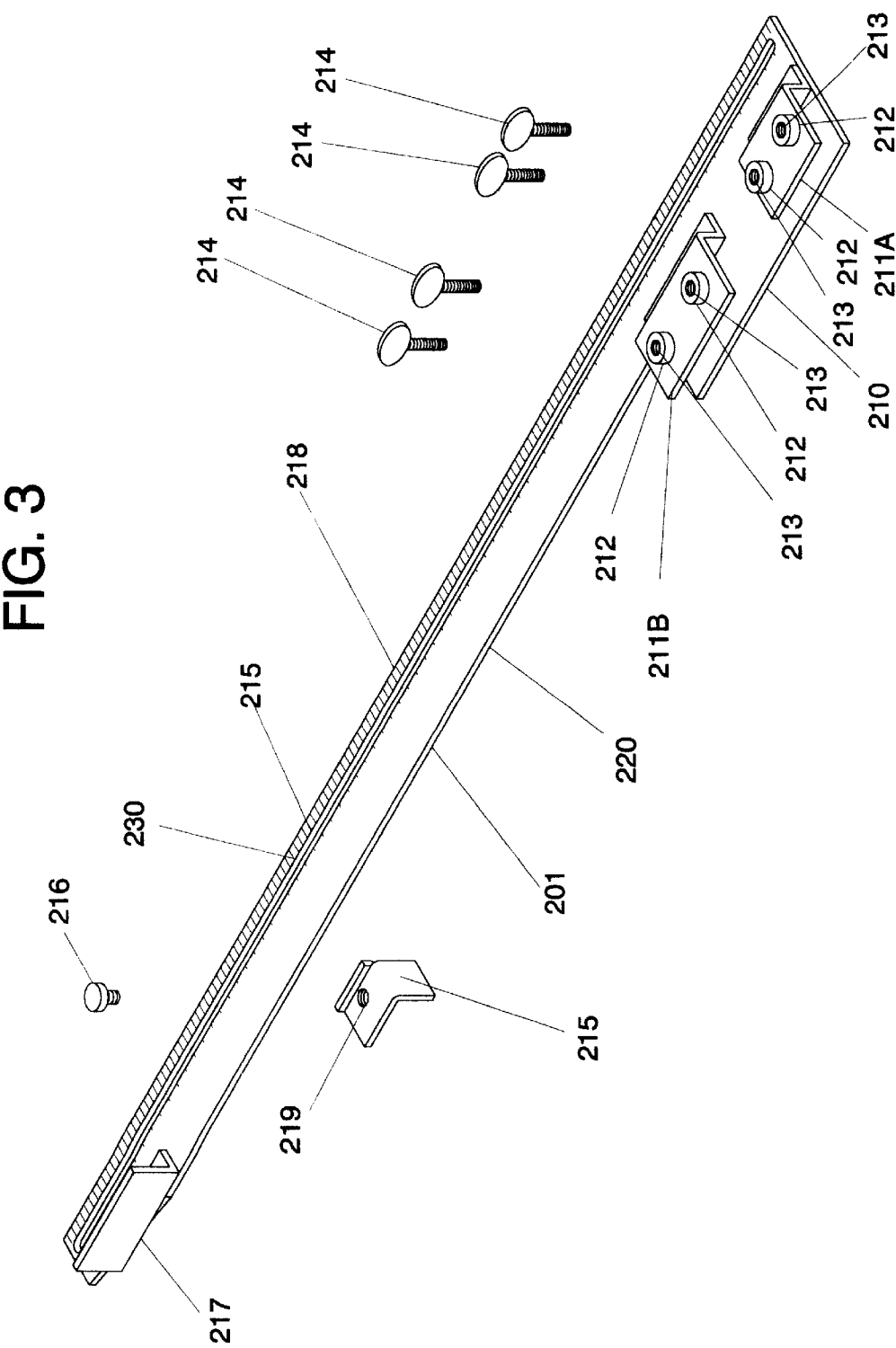
FIG. 3 illustrates an alternate embodiment of the present invention which includes a slot as opposed to a multiplicity of apertures.

FIG. 3 shows an alternate embodiment of the present invention, a slotted combination saw guide and gauge 201 comprising a slotted scale 220, an upper jaw 211A, a longer upper jaw 211B, thumb screws 214, slot guide clamp screw 216, and an optional slot guide flange 217. The slotted scale 220 comprises a slotted base 210, a slot 230, and slotted scale gradations 218. The upper jaw 211A and the longer upper jaw 211B each contain at least one slotted base mount reinforcement 212 with a threaded aperture 213. The slot guide clamp screw 216 fits through the slot 230 and into a slot guide threaded aperture 219 of a slot guide 215. The slot guide 215 is positioned as desired, then clamped in position against the slotted scale 220 by tightening the slot guide clamp screw 216 into the slot guide threaded aperture 219 to serve as a guide means.

The slotted combination saw guide and gauge 201 is attachable to the powered saw base 30 as was the combination saw guide and gauge 1 as shown in FIG. 2. The powered saw base 30 slips in between the upper jaws 211A and 211B and the slotted base 210 and the thumb screws 214 which are insterted into the threaded apertures 213 are tightened to hold the slotted combination saw guide and gauge 201 in position.

The slot guide 215 clamped in position as previously described provides the desired spacing between the slot guide 215 and the desired line of cut of the saw as indicated by the dotted line 31 in FIG. 2

Also, the optional slot guide flange 217 is used for longer embodiments of the slotted combination saw guide and gauge 201 so a sawer can manually stabilize the guiding action of the invention. This is a desirable feature when ripsawing wide cuts. An example of a wide cut is splitting a 4 foot by 8 foot sheet of plywood down the center.

Figure 4:
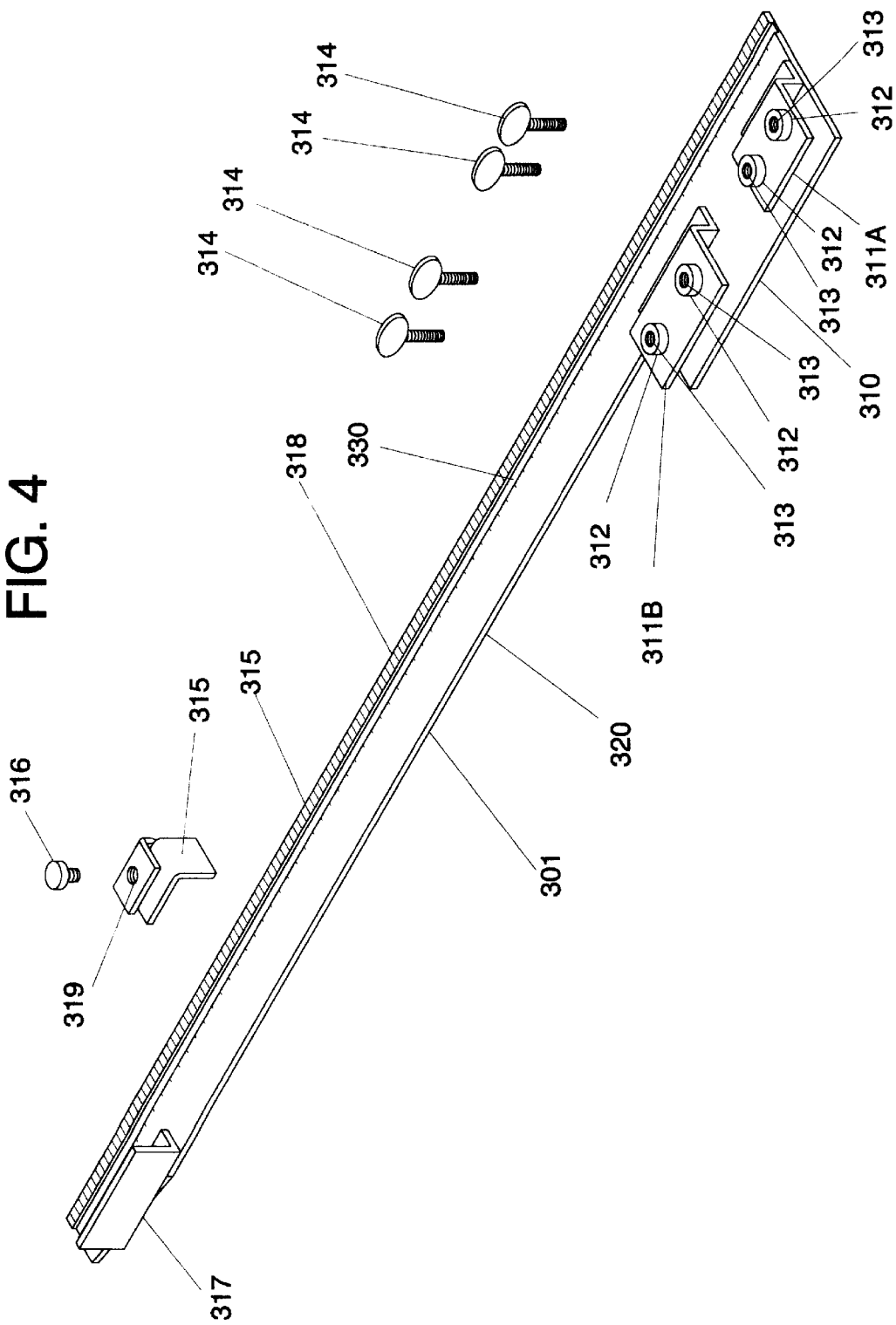
FIG. 4 illustrates a second alternate embodiment of the present invention which includes a groove as opposed to a multiplicity of apertures.

FIG. 4 shows a second alternate embodiment of the present invention, a grooved combination saw guide and gauge 301. The difference between these various embodiments is that the preferred embodiment uses a multiplicity of apertures 15, the alternate embodiment uses a slot 230 instead of apertures 15, and the second alternate embodiment uses a groove 330 instead of apertures 15 or a slot 230. Instead of a slot guide 215 as is used in the alternate embodiment, there is a groove guide 315 which includes a groove guide threaded aperture 319 which is clamped in position by a groove guide screw 316 through the groove guide threaded aperture.

As shown in FIG. 4, the grooved combination saw guide and gauge 301 comprises a grooved scale 320, a jaw 311A, a longer jaw 311B, jaw screws 314, groove guide member 315, the groove guide screws 316, and an optional groove guide flange 317. The grooved scale 320 comprises a grooved base 310, a groove 330, and gradations 318. The jaws 311A and 311B each contain at least one jaw mount reinforcement 312 with reinforcement threaded apertures 313.

The groove guide screw 316 through the groove guide threaded aperture 319 of the groove guide member 315 into the grove 330 of the grooved scale 320, secures the groove guide member 315 in position, against the grooved scale 320 as required, thus serving as a guide means for the grooved combination saw guide and gauge 301.

The grooved combination saw guide and gauge 301 is attachable to a base plate 30 in the manner as shown for the combination saw guide and gauge in FIG. 2.

The gradations 18 on the preferred embodiment, as do the gradations 218 on the alternate embodiment and the gradations 318 on the second alternate embodiment serve as a means of measurement. A purpose served by said means of measurement is enablement of setting a width of material to be cut.

Figure 5:
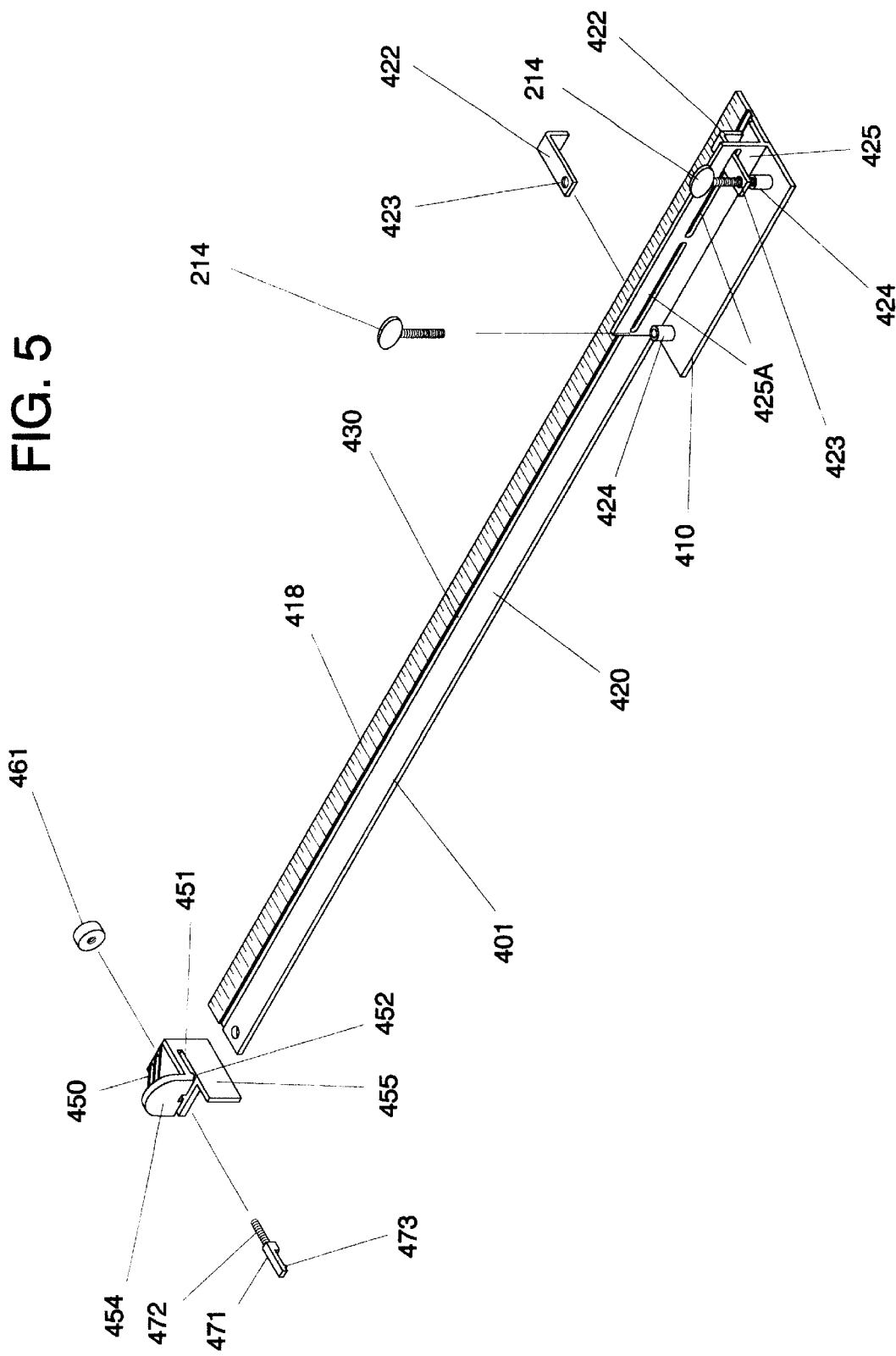
FIG. 5 is a third embodiment with a different clamping mechanism and a different guide member arrangement.
Figure 5A:
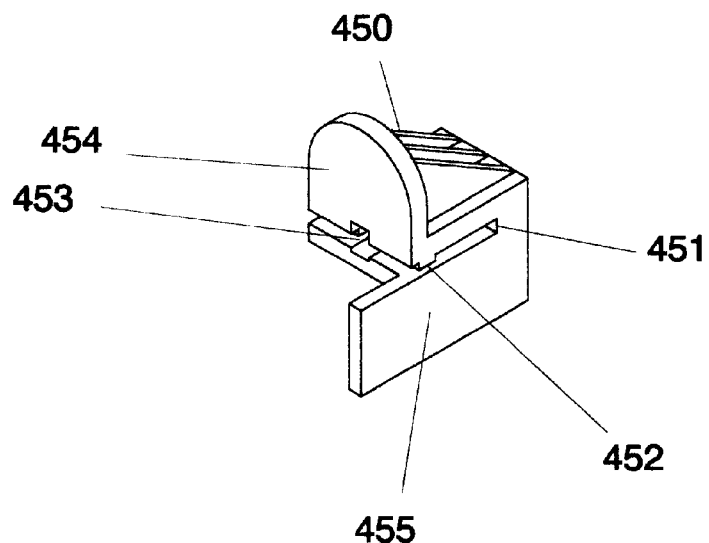
FIGS. 5A and 5B are views of a third embodiment guide membeb
Figure 5B:
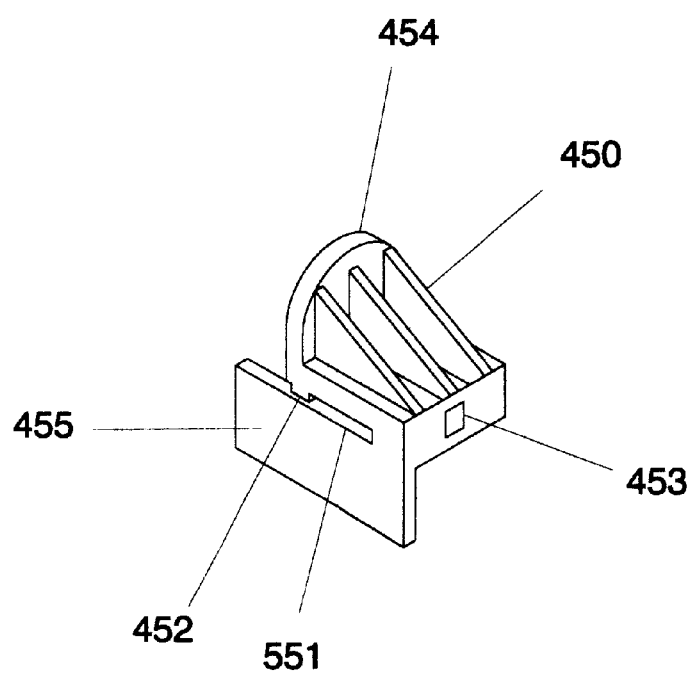

FIG. 5 illustrates a third embodiment of the present invention, an alignment groove combination saw guide and gauge 401 comprising an alignment groove base 410, an alignment groove scale 420, and upright 425, thumb screws 214, clamp arms 422, protective covers 424, a guide assembly 450, lock peg 471, a lock nut 461, and an upright 425.

The alignment groove scale 420 comprises an alignment groove base 410, an alignment groove 430, and gradations 418.

The upright 425 comprises upright slots 425. A preferred embodiment of the upright 425 is achieved by coupling an angle shape to the alignement groove base 410.

The clamp arms 422 each have a threaded screw aperture 423.

The lock peg 471 comprises a thread 472 and a tit 473.

Each clamp arm 422 is inserted into one of the upright slots 425A. A thumb screw 214 through the threaded screw aperture 423 can be tightend as required to serves a clamping function clamping a powered saw base (such as the powered saw base 30 shown in FIG. 2) between the alignment groove base 410 and said clamp arms 422.

Figure 10:
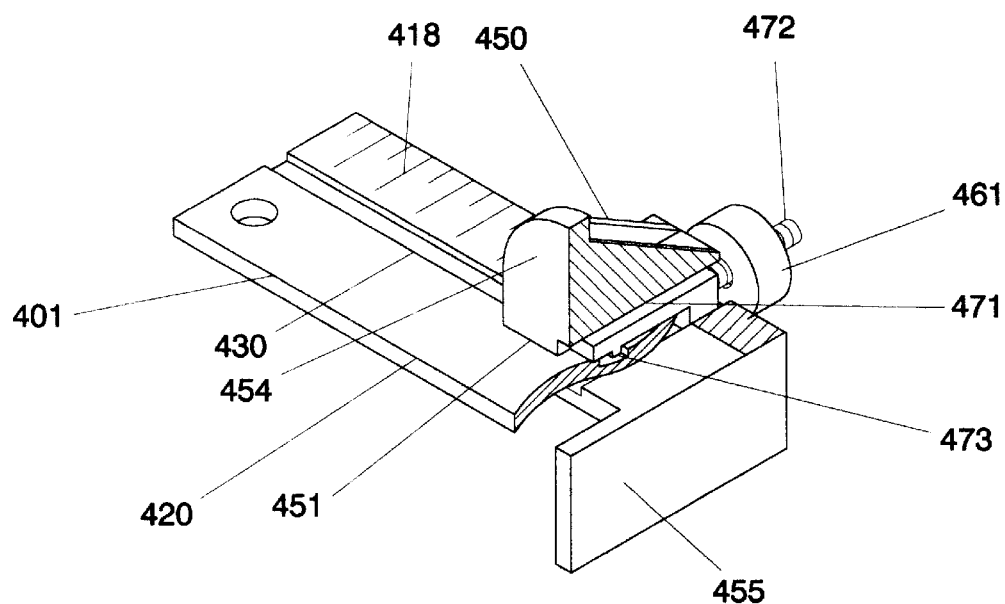
FIG. 10 illustrates the third embodiment guide assembly.

Referring to FIGS. 5, 5A, 5B, and 10, the guide assembly 450 comprises a guide groove 451, an alignment projection 452 which mates with the alignment groove 430 of the alignment groove scale 420, a rectangular clearance 453, a grip tab 454, and a guide 455. The guide assembly 451 can be locked in position to serve as a guide means for the alignment groove saw guide and gauge 401 by the insertion of the lock peg 471 into the rectangular clearance 453, with the tit 473 engaging the alignment groove 430, and with the threaded locking nut 461 tightened sufficiently on the thread 472 of the lock peg 471. The guide assembly 451 so locked in position serves as a guide means. FIG. 10 shows a cross section view of the guide assembly 450 installed on the third embodiment of the present invention, the alignment groove combination saw guide and gauge 401.

Figure 6:
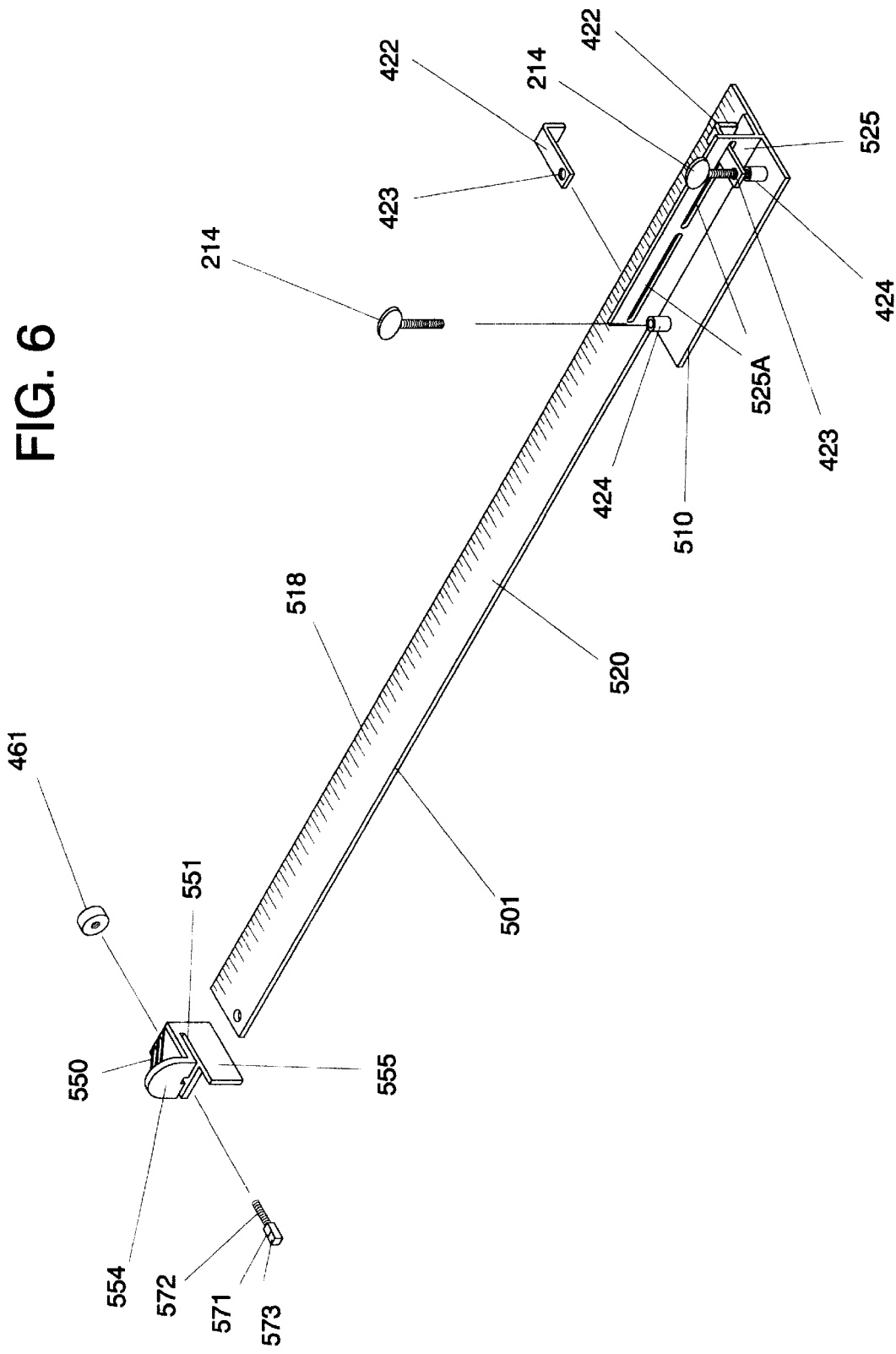
FIG. 6 is a fourth embodiment with a different guide means.

FIG. 6 illustrates a fourth embodiment of the present invention, a fourth embodiment combination saw guide and gauge 501 comprises a non-grooved scale 520, a slotted upright 525, thumb screws 214, clamp arms 422, protective covers 424, a wedge guide assembly 550, and a taper lock peg 571, and a threaded locking nut 461.

The slotted upright 525 comprises slots 525A.

The nongrooved scale 520 comprises a nongrooved base 510, and nongrooved gradations 518

The protective covers 424 are of an appropriate plastic or rubber and serve to protect the nongrooved scale base 510 from wear from the thumb screws 214.

The taper lock peg 571 comprises a threaded stud 572 and a taper 573.

Figure 6A:
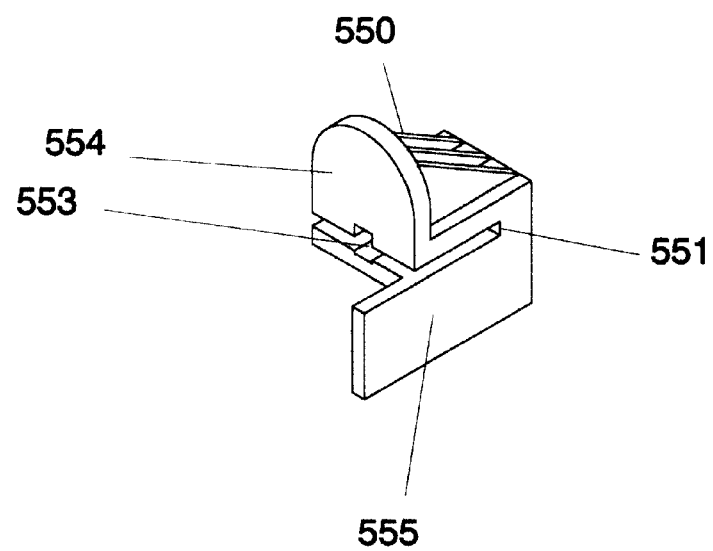
FIGS. 6A and 6B further illustrate the guide means shown in FIG. 6.
Figure 6B:
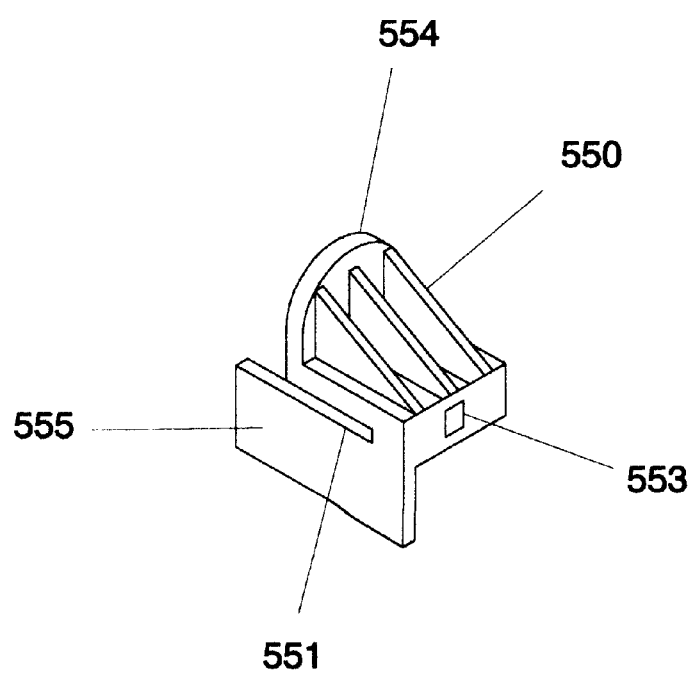

Referring to FIGS. 6, 6A, and 6B, the wedge guide assembly 550 comprises a guide means groove 551, a rectangular clearance 553, a guide means grip tab 554, and a guide plate 555.

The wedge guide assembly 550 when locked in position on the nongrooved scale 520 by means of the taper lock peg 571 in conjunction with the threaded locking nut 461 serves as a guide means during the operation of the fourth embodiment combination saw guide and gauge 501.

FIG. 7 illustrates an alternative to the thumb screws 214. Instead of using the thumb screw 214 with the protective cover 424 in conjunction with a clamp arm 422, a ball screw 621 is used with a foot 622. The ball screw 621 comprises a ball 621A. The foot 622 comprises a ball socket 622A. The foot 622 protects the base 510 from wear.

FIG. 9 illustrates a fifth embodiment of the invention, a fifth embodiment combination saw guide and gauge 801 comprising a fifth embodiment scale 820, a modified upright 825, ball screws 621 each with a foot 622, clamp arms 422, protective covers 424, a plate 700, a plate screw 704, the web guide 550, the taper lock peg 571, and the threaded locking nut 461.

The fifth embodiment scale 820 comprises a fifth embodiment base 810 and fifth gradations 818.

The modified upright 825 comprises modified slots 825A and an upright aperture 825B.

The plate 700 (Ref. FIGS. 8 and 9) comprises a clearance 701 and a nut 703 coupled to the plate 700. The nut 703 is shown coupled to the plate 700 in FIG. 8 by a weld 702. As obvious to anyone skilled in the art, there are equivalent ways to couple the nut 703 to the plate 700, including forming it from the plate 700.

The plate 700 in conjunction with the plate screw 704 inserted through the upright aperture 704 serves as a means of locking the clamp arms 422 more securely in position when said clamp arms 422, in conjunction with the ball screws 621 and the ball feet 622 are locking the fifth embodiment combination saw guide and gauge 801 on a powered saw base 30 such as is shown in FIG. 2. This is an enhanced means of attaching a combination saw guide and gauge than was previously discussed in the other embodiments.

To operate the combination saw guide and gauge:
a) follow the poer saw manufacturer safety directions,
b) don appropriate safety equipment,
c) conform to safety rules, reguatlions, and safe work practises,
d) attach the combination saw guide and gauge to a power base saw by adjusting the means of attachment of the combination saw guide and gauge until the combination saw guide and guage is clamped securely on the power saw base,
e) set the guide means for a desired width of cut,
f) check material to be cut is properly supported,
g) turn on the power saw,
h) make the cut,
i) make additional cuts as required,
j) turn off powered saw,
k) properly store saw,
l) properly store the combination saw guide and gauge,
m) properly store material, and
n) clean up area.

Although the description above contains many specificities, these should not be construed as limiting the scope of the invention but as merely providing illustrations of some of the presently preferred embodiments of this invention.

For example, the guide member 16 could be a headed dowel or a nail.

As another example, the material to be cut is not limited to wood. This invention will work with other materials, such as metal, plastic, sheetrock, masonry, and formica, to name a few.

Thus the scope of the invention should be determined by the appended claims in the formal application and their legal equivalents, rather than by the examples given.

I claim:

1. A saw guide and gauge attachable to an electric saw having a base, said saw used in making cuts on a work surface and said saw guide and gauge including;
   a linear scale;
   clamping means for attaching said linear scale to said base,
   said scale having apertures at certain known distances from said base,
   a cylindrical guide member having a body portion with a cross sectional area such that said body
   portion will pass through said aperture in said scale, such that when said cylindrical guide member body portion is placed through said aperture and when said base is placed on a work surface to be cut; said saw guide will maintain said saw base at the certain known distance from an edge of said work surface while said saw is in use.

2. The combination saw guide and gauge of claim 1 further comprising:
   a) at least one upper jaw with a threaded clearance and
   b) at least one screw,
   wherein said at least one upper jaw is coupled to said base of said scale,
   wherein said at least one upper jaw and said at least one screw serves as a means of attaching said combination saw guide and gauge to, and holding in position on, said powered saw base.

3. The combination saw guide and gauge of claim 2 further comprising:
   a) a guide flange coupled to the scale at an end distal from the at least one upper jaw.

4. The combination saw guide and gauge of claim 1 wherein the scale further comprises a means of measurement.

5. The combination saw guide and gauge of claim 4 wherein said means of measurement consists of gradations.

6. A method of using the combination saw guide and gauge of claim 1 comprising the steps of:
   a) attaching the combination saw guide and gauge to a the base saw by adjusting the means of attachment of the combination saw guide and gauge until the combination saw guide and gauge is clamped securely on the power saw base, b) setting the guide means for a desired width of cut, c) checking material to be cut is properly supported, d) turning on the power saw, e) making the cut.

7. A saw guide and gauge attachable to an electric saw having a base and a blade passing through said base, said saw used in making a saw path cut in a work surface and said saw guide and gauge including;

a linear scale;

clamping means for attaching said linear scale to a leading edge of said base, said scale having adjustable guide means to allow the setting of distances from said blade, said guide means being movable along said scale and said front edge or said base to a position adjacent to said blade such that a very narrow distance exists between the edge of said work surface and said blade.

8. The combination saw guide and gauge of claim 7 wherein said scale of the combination saw guide and gauge further comprises a groove for receiving said guide means.

9. The combination saw guide and gauge of claim 8 wherein the guide means comprises:

a) groove guide member with at least one threaded clearance, and b) at least one screw, wherein the at least one screw is threaded through the at least one threaded clearance into said groove of said scale, securing said guide member against the scale.

10. The combination saw guide and gauge of claim 8 wherein the guide means is a guide assembly comprising:

a) a guide groove, b) an alignment projection, c) a rectangular clearance, d) a grip tab, and e) a guide, wherein the guide assembly can be locked in position on said combination saw guide and gauge by the insertion of a lock peg with a thread into the rectangular clearance with a tit engaging the groove of said combination saw guide and gauge and with a threaded locking nut tightened sufficiently on the thread of the lock peg.

11. The combination saw guide and gauge of claim 7 wherein the guide means is a wedge guide assembly comprising:

a) a guide means groove, b) a rectangular clearance, c) a guide means grip tab, and d) a guide plate, wherein the wedge guide assembly can be locked in position on said combination saw guide and gauge by the insertion of a taper lock peg with a threaded stud and a taper in conjunction with a threaded locking nut.

12. The combinations saw guide and gauge of claim 9 further comprising:

a) a plate with a clearance and a nut, and b) a plate screw, wherein the upright includes a aperture through which the plate screw is inserted, said plate screw being inserted through the aperture and into the nut, then tightened, drawing the plate against the clamp arms, securing said clamp arms more securely in position when said clamp arms in conjunction with the screws are locking the combination saw guide and gauge on a powered base saw.

13. A saw guide and gauge used to guide a saw having a blade in cutting a path through a work surface comprising;

a linear scale which can be clamped at one end thereof to a saw;

guide means which can be moved along said linear scale, said guide means including locking means to fix said guide means relative to said scale;

said guide means including a surface normally in contact with an edge of said work surface, said surface maintaining a set distance between said edge and said blade of said saw while in use and;

said linear scale being attached to said saw by means that allow said guide means to be positioned such that said set distance can be adjusted in a range of distances from a length approximately equal to the length of said scale down to a length of zero where said blade would move along said edge of said work surface as said saw made its cut.

14. The combination saw guide and gauge of claim 1 wherein the means of attaching the powered saw guide and gauge to a powered saw base comprises:

a) clamp arms inserted through slots in an upright coupled to a base of the scale, b) screws which can be tightened as required to clamp a powered saw base between said base and and said clamp arms for attachment of the combination saw guide and gauge to said powered saw base.

* * * * *